Nov. 21, 1933.     R. HARZBECKER     1,936,054
PROTECTIVE DEVICE FOR MOTOR CARS AND OTHER VEHICLES
Filed Dec. 8, 1930
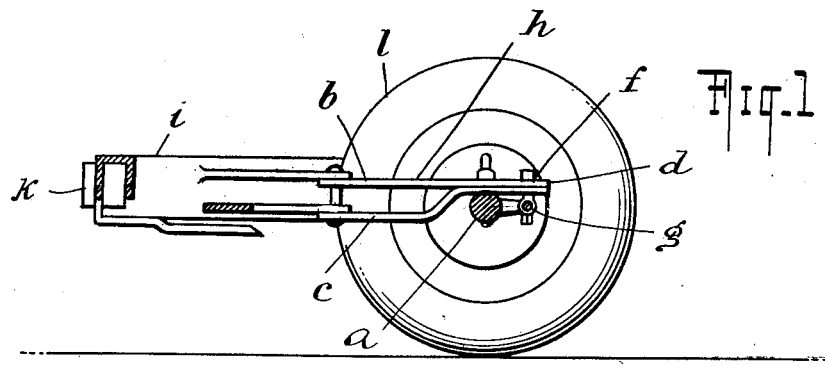
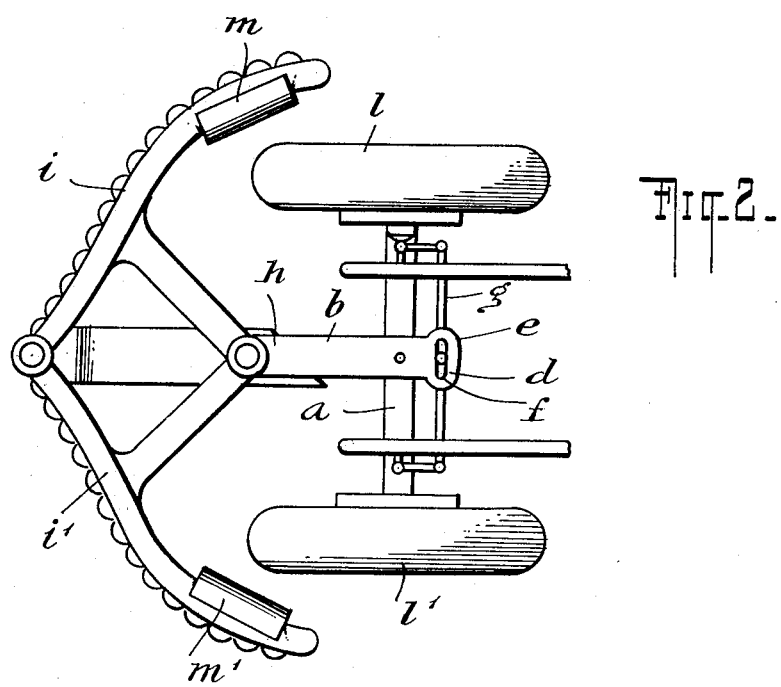
INVENTOR
RUDOLF HARZBECKER
BY Richards & Geier
ATTORNEYS Patented Nov. 21, 1933

1,936,054

UNITED STATES PATENT OFFICE 1,936,054

PROTECTIVE DEVICE FOR MOTOR CARS AND OTHER VEHICLES

Rudolf Harzbecker, Dresden, Germany

Application December 8, 1930, Serial No. 500,729, and in Germany December 13, 1929

2 Claims. (Cl. 293—48)

The invention relates to a fender for motor vehicles of the kind comprising a frame faced with anti-friction rollers.

An object of the invention is to provide a fender for motor vehicles by means of which a vehicle colliding with an obstacle is immediately steered away from said obstacle.

The invention consists in providing double-armed levers pivoted to the front axle of the vehicle, each of said levers having in its rear arm a slot whereby it co-operates with a pin on the connecting rod of the steering gear for steering the vehicle away from an obstacle, the lever being deflected by impact with said obstacle.

Fig. 1 of the accompanying drawing represents a sectional side view of the arrangement, and Fig. 2 is a top view of the same.

In the drawing the front axle of a vehicle carries two pivoted levers $b$ and $c$, which are arranged one above the other. The rear end $d$ of each lever is widened transversely and formed with a transverse, elongated slot $e$, and a pin $f$ secured to the steering gear $g$, engages in the slots of the two levers.

The ends $h$ of the levers $c$, $d$ are connected with the rolling device $k$ carried by two angular bars $i$ and $i'$. Rollers $m$ and $m_1$ are situated opposite the wheels 1 of the vehicle.

If the lever $i_1$ should make impact with an obstacle, the lever arm $i$, will be deflected towards the wheel $l_1$, and will act on the steering gear $g$ by means of the slot $e$ and the pin $f$ in such a way as to move the wheel axle to the right and to steer the vehicle away from the obstruction, the obstacle coming in contact with the roll $k$.

I claim:

1. A fender for motor cars and other vehicles, comprising a bar, a double-armed lever connected with said bar and having a slot in one of its ends, and a pin passing through said slot and connected with the steering device of the vehicle.

2. A fender for motor cars and other vehicles, comprising two interconnecting bars, two double-armed levers connected with said bars and having slots in their ends, and a pin passing through said slots, and connected with the steering device of the vehicle.

RUDOLF HARZBECKER.